(12) United States Patent
Mohan et al.

(10) Patent No.: US 8,453,740 B2
(45) Date of Patent: *Jun. 4, 2013

(54) SYSTEM OF PIPES FOR USE IN OIL WELLS

(75) Inventors: Pidatala K. Mohan, West Windsor, NJ (US); Steven A. Mestemacher, Parkersburg, WV (US); Kimberly Dawn Farnsworth, Walker, WV (US); Laurence Waino McKeen, Sewell, NJ (US); W. Douglas Obal, Vail, AZ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/939,426

(22) Filed: Nov. 4, 2010

(65) Prior Publication Data

US 2011/0041924 A1 Feb. 24, 2011

Related U.S. Application Data

(63) Continuation of application No. 11/286,884, filed on Nov. 23, 2005, now abandoned.

(60) Provisional application No. 60/630,942, filed on Nov. 24, 2004.

(51) Int. Cl.
*E21B 37/06* (2006.01)
*F16L 9/147* (2006.01)

(52) U.S. Cl.
USPC .......................................... 166/304; 138/146

(58) Field of Classification Search
None
See application file for complete search history.

(56) References Cited

U.S. PATENT DOCUMENTS

| | | | |
|---|---|---|---|
| 2,070,291 A | 2/1937 | McHugh | |
| 2,685,707 A | 8/1954 | Llewellyn et al. | |
| 3,087,827 A | 4/1963 | Klenke et al. | |
| 3,087,828 A | 4/1963 | Linton | |
| 3,087,829 A | 4/1963 | Linton | |
| 3,246,671 A | 4/1966 | Stein et al. | |
| 3,462,825 A | 8/1969 | Pope et al. | |
| 3,551,006 A | 12/1970 | James | |
| 4,256,523 A | 3/1981 | Ekstrom | |
| 4,355,664 A | 10/1982 | Cook et al. | |
| 4,380,618 A | 4/1983 | Khan et al. | |
| 4,447,076 A | 5/1984 | Evans | |
| 4,743,658 A | 5/1988 | Imbalzano et al. | |
| 5,244,237 A | 9/1993 | Harvey | |
| 5,566,984 A | 10/1996 | Abbema et al. | |
| 5,664,608 A | 9/1997 | Kawasaki | |
| 5,932,673 A | 8/1999 | Aten et al. | |
| 5,972,494 A | 10/1999 | Janssens | |
| 6,000,436 A | 12/1999 | Auvil et al. | |
| 6,041,827 A | 3/2000 | Takahashi et al. | |
| 6,232,372 B1 | 5/2001 | Brothers et al. | |
| 6,291,054 B1 | 9/2001 | Thomas et al. | |
| 6,397,895 B1 | 6/2002 | Lively | |
| 6,518,349 B1 | 2/2003 | Felix et al. | |
| 6,632,902 B2 | 10/2003 | Lahijani | |
| 2003/0116214 A1 | 6/2003 | Meli et al. | |
| 2003/0221735 A1 | 12/2003 | Kumagai et al. | |
| 2004/0138367 A1 | 7/2004 | Lahijani | |
| 2005/0016610 A1 | 1/2005 | Lahijani | |
| 2006/0070677 A1 | 4/2006 | Inoue et al. | |
| 2007/0148391 A1 | 6/2007 | Lahijani | |
| 2009/0078328 A1 | 3/2009 | Albert et al. | |

FOREIGN PATENT DOCUMENTS

| | | |
|---|---|---|
| EP | 0 190 092 | 3/1989 |
| EP | 0 226 668 B1 | 1/1992 |
| GB | 2318399 A | 4/1998 |
| JP | 55073374 | 6/1980 |
| WO | 2005059430 A1 | 6/2005 |
| WO | 2005100843 A2 | 10/2005 |

*Primary Examiner* — Zakiya W Bates
(74) *Attorney, Agent, or Firm* — Keven J. Boland

(57) ABSTRACT

Disclosed is a process for reducing the deposition of asphaltenes, paraffin wax, or inorganic scale in an oil well pipe by providing a system of pipes that convey any flowable medium, such as oil and gas. More particularly the system of pipes is provided with different coatings or linings for the interior and exterior surfaces of such pipes, depending on the environment in which the pipes are used. The pipes may be coated with different materials, which may be of different thicknesses, with various configurations of coatings or linings. Such coating may be on the interior and/or exterior of the pipes.

8 Claims, No Drawings

SYSTEM OF PIPES FOR USE IN OIL WELLS

CROSS-REFERENCE TO RELATED APPLICATION

This application claims priority under 35 U.S.C. §119 from U.S. Provisional Application Ser. No. 60/630,942, filed Nov. 24, 2004.

FIELD OF THE INVENTION

This invention relates to pipes that convey any flowable medium, such as chemicals, food and in particular, oil and gas, and more particularly to a system of pipes having different coatings or linings for the interior and exterior surfaces of such pipes, depending on the environment in which the pipes are used.

BACKGROUND OF THE INVENTION

Pipes used in the production and transportation of flowable media are subject to corrosion and plugging. An example of such a pipe is oil pipe which is generally large and for reasons of economy is manufactured from carbon steel rather than more expensive corrosion resistant alloys. Corrosion is induced by the hot underground environment in which downhole pipes convey oil from deeply buried deposits to the earth's surface. Materials such as water, sulfur, sulfur dioxide, carbon dioxide, present in the oil typically make it acidic causing corrosion of the interior surface of the pipe. Even at cooler temperatures, transportation pipelines that extend for long distances close to the earth's surface experience the effects of corrosion because of the long contact times involved. Corroded pipes are difficult and expensive to replace.

Plugging occurs when organic materials soluble in the oil at high temperatures of the oil deposit become insoluble as the oil cools during the rise through a pipe to the earth's surface. Plugging may particularly be a problem for offshore wells because the oil is subjected seawater temperatures. The resultant insoluble materials, such as asphaltenes and paraffin waxes, tend to plate out of the oil at the high temperature of the oil deposit on the interior surface of the pipe, restricting the oil flow and eventually plugging the pipe. Also, soluble inorganic material, commonly referred to as scale and generally comprising calcite and/or barite, present in the oil or in the presence of salt water associated with conveying of oil from underground of subsea deposits, are present in the oil at the high temperature of the oil deposit. Plugging also occurs during long distance conveying of the oil through pipelines. Plugging requires that production or transportation cease while the pipe is cleaned out either by mechanical scraping (pigging), chemical treatment or hot oiling. Such cleaning reduces productivity and involves large maintenance costs. Similar problems occur for pipes used in the manufacture and transportation of corrosive chemicals in the chemical processing industry.

Moreover, the environment exterior to the pipes in which oil well pipes are used will contribute to such pluggage and corrosion in oil pipes. For instance, when a pipeline is installed offshore on the sea floor it may have high spots and low spots due to the undulation of the sea floor. In the low spots water may accumulate on the interior of the pipe. This water may come from hydrostatic testing of the pipeline or water entrained in the fluids carried in the pipeline. Such water may cause corrosion if it penetrates the pipe. Also, the water may contain carbonic acid or hydrochloric acid. And occasionally oil and gas may contain small amounts of corrosive gases such as carbon dioxide and hydrogen sulfide. When either of these gases are dissolved in water, acid is created that may attack the surface of the pipe. All of these causes may contribute to the failure of the pipe.

Solutions have been proposed in the oil industry for preventing corrosion and pluggage by coating oil pipes on their interior surface and their exterior surfaces, see, for example, U.S. Pat. No. 6,397,895 to Lively. This patent discloses the use of a phenolic primer in combination with an insulating layer and an abrasion resistant layer formed of an epoxy ceramic on the interior of a pipe. However, such epoxies do not provide a particularly non-stick surface to the oil. Lining the interior surface of oil well pipes with a fluoropolymer, such as polytetrafluoroethylene (PTFE), for example, as disclosed in EP 0 1910 092 to Mannesman Akt is known. Pope et al. in U.S. Pat. No. 3,462,825 have previously described manufacturing a pipe with a fluoropolymer liner. Such fluoropolymer linings present a non-stick surface to the oil. However, because of this non-stick property, these linings do not adhere particularly well to the interior surface of the pipe. In addition, the varying conditions of temperature, pressure and even mechanical contacts can cause such linings to separate from the interior surface, leading to loss in corrosion and possibly even non-stick protection if the coating or lining ruptures. However, at this time there does not exist a commercially attractive option for reducing pluggage and corrosion in pipes.

Thus, there remains a need for solving the problems of corrosion and plugging that occurs in pipes conveying flowable media, especially oil pipes, whether used in oil wells or for oil conveying. What would be desirable is a pipe system which is tailored to the particular environment in which the pipes are used, where the interior surface of such pipes resists the deposit of insoluble organic materials and has resistance to the corrosive effects of acids, and the exterior surface insulates the pipes in certain harsh environments. Further there is a desire that the interior and exterior surfaces be durable lasting for many years in harsh environments.

BRIEF SUMMARY OF THE INVENTION

The present invention satisfies the need for solving the problems of corrosion and pluggage in pipes by providing a system of pipes for conveying flowable media, especially an oil pipe, where different sections of pipes are coated or lined on their interior and/or exterior surfaces with different materials in accordance with the demands of the environment in which the pipes are used.

Where used, the lining on the interior surface of the pipe presents a non-stick surface to the oil, whereby the insoluble organic materials present in the oil do not stick to the lining, and restriction of oil flow and pluggage is minimized or avoided. In addition, the lining on the interior surface of the pipe is impermeable to salt water, as well as to the corrosive materials present in the oil.

Where used, the lining on the exterior of the pipe protects the pipe from the harsh effects of the environment. In addition, the lining on the exterior of the pipe maintains the temperature difference between the product inside the pipe and the product outside the pipe, which helps to keep the media in the pipe flowable.

It is an advantage of the present invention to be able to tailor the use of such linings so that particular problems may be addressed by particular sections of pipe. In addition, with the present invention, certain sections of pipe need not be lined at al.

The lining system on the interior surface and/or exterior of the pipe either minimizes or eliminates (i) the deposition of asphaltenes, paraffin wax, and inorganic scale, so as to minimize or eliminate pluggage of the oil pipe and (ii) corrosion of the interior surface of the pipe. The reduction in deposition can be characterized by being at least 40%, preferably at least 50%, of at least one of asphaltenes, paraffin wax, and inorganic scale as compared to the interior surface of the pipe without the lining being present. Reductions of at least 60%, 70%, 80% and even at least 90% may be realized. Preferably these reductions apply to at least two of the deposition materials, and more preferably, to all three of them. The reduced deposition performance of the lined pipes of the present invention is in contrast to the result obtained for unlined pipes, as well as for epoxy resin-lined oil pipe, where surprisingly the deposition is greater than for the unlined pipe. This deposition reduction is accompanied by the added benefit of salt water impermeability as well as corrosion resistance, as compared to unlined oil pipe.

The lining comprises a fluoropolymer, which has non-stick properties. In one embodiment, the lining may comprise a perfluoropolymer, and in particular, a pure perfluoropolymer. The pipe of this embodiment of the present invention has a continuous adherent perfluoropolymer coating, or lining, on its interior surface, with the exposed surface of the perfluoropolymer providing a non-stick surface for oil to flow freely through the pipe.

Because of the non-stick properties of fluoropolymer, however, the lining may not adhere particularly well to the interior surface of the pipe. Therefore, in a preferred embodiment, hereinafter referred to as the primer layer/overcoat embodiment, the lining comprises a primer layer adhered to the interior surface of the pipe and a fluoropolymer overcoat adhered to the primer layer. Instead of an overcoat, a preformed liner may be adhered to the primer layer. In either case, the intervening primer layer provides adhesion both to the overcoat and to the interior surface of the pipe. The primer layer by itself does not provide sufficient non-stick character and impermeability to the corrosive materials present in the oil to protect the interior surface of the pipe from corrosion. With the combination of the primer layer and the overcoat, the insoluble organic materials present in the oil do not stick to the lining, and restriction of oil flow and pluggage is minimized or avoided. In addition to presenting a non-stick surface to the oil, the overcoat is impermeable to salt water, as well as to the corrosive materials present in the oil.

In the primer layer/overcoat embodiment, either just the overcoat, or the overcoat and the primer layer may be a perfluoropolymer. In this latter case, the presence of perfluoropolymer in the primer layer, as well as the overcoat, enables the overcoat to melt bond to the primer layer when they are heated.

In order to enhance salt water impermeability as well as corrosion resistance as discussed above, the lining on the interior surface of the pipe may include particles which form a mechanical barrier against permeation of water, solvents and/or gases to the pipe.

Thus, in accordance with the present invention, there is provided a system of pipes for conveying flowable media comprising a first pipe and a second pipe, where the second pipe has a lining adhered to the interior surface of the pipe, and the lining of the second pipe comprises a primer layer adhered to the interior surface of the pipe and an overcoat or a preformed film comprising a fluoropolymer adhered to the primer layer. Alternatively, the lining of the second pipe consists essentially of a pure perfluoropolymer. According to one embodiment, a barrier layer may be formed between the primer layer and the overcoat, where the barrier layer includes a plurality of particles which form a mechanical barrier against permeation of water, gases and solvents to the pipe.

DETAILED DESCRIPTION OF THE INVENTION

The present invention is directed to pipes which convey flowable medium, and in particular to lining the interior of pipes and insulating the exterior of such pipes. Substrates suitable for pipes of this invention include a wide variety of metal substrates such as aluminum, stainless steel, and especially metals that are not corrosion resistant such as carbon steel.

The flowable medium may be a chemical, including paints and pharmaceuticals. Or the pipes may be useful in the food processing industry, where the flowable medium is ketchup, peanut butter or cream cheese, where concern over antimicrobial buildup is an issue. In addition, the flowable medium may be gas, where there are no deposition concerns, but corrosion is an issue. For this reason, and because the present invention is especially useful for metal substrates that are not corrosion resistant, the present invention is particularly applicable to down-hole, i.e., oil well pipes, or above-ground pipeline systems, i.e., oil-conveying pipes, oil pipes, where both deposition and corrosion are concerns. Both types of pipes are generically referred to herein as oil pipes. The type and size of pipe is selected on the basis of use. For instance, the choice of pipe may depend on whether the pipe is used in the oil well or to form an oil pipeline. If used as oil well pipes, the pipes are relatively large. Inner diameters of 2 in (5.08 cm), 2⅜ in (6.03 cm) and 3 in (7.6 cm) and larger and lengths of at least 20 ft (6.1 m) are quite common.

While the relative dimensions of the oil pipe are large, the thickness of the lining on the interior surface of the pipe is quite small. Where the lining comprises a primer layer and an overcoat, the primer layer needs only to be thin enough to adhere the overcoat layer to itself and thereby to the interior surface of the oil pipe. The overcoat will generally be from about 51 to 6350 micrometers (2 to 250 mils) thick, with the primer and overcoat coating thicknesses depending on how these layers are formed and on the thickness desired for the particular oil pipe application. The primer layer of the oil pipe preferably is no greater than 1 mil (25 micrometers) thick and the overcoat is preferably 2 to 250 mils (51 to 6350 micrometers) thick. In applications where thin coatings are desired, the thickness of the overcoat is preferably 2-7 mils (51-175 micrometers). In one preferred embodiment where the total coating thickness is relatively small, the overall coating thickness (primer layer thickness plus overcoat thickness) of the fluoropolymer coating being no greater than 8 mils (203 micrometers).

There is of course an economical advantage to supplying thin linings in applications which are determined to be less severe. However, thick linings are preferred in highly abrasive or in severely corrosive environments. In those applications where thick coatings are preferred, the thickness of the overcoat is 25-250 mils (635-6350 micrometers), preferably 30-100 mils (762-2540 micrometers). In a preferred embodiment where the total coating thickness is relatively large, the overall lining thickness (primer layer thickness plus overcoat thickness) of the fluoropolymer coating is at least 26 mils (660 micrometers). Instead of applying an overcoat, thick linings may be achieved by forming a preformed perfluoropolymer film liner on the primer layer. The use of preformed film liner enables a relatively thick lining of uniform thickness to be formed.

The lining of the present invention comprises a fluoropolymer. In one embodiment the lining of the present invention consists essentially of a perfluoropolymer. In a perfluoropolymer, the carbon atoms making up the polymer chain, if not substituted by oxygen, are substituted with fluorine atoms. The end groups of the perfluoropolymer may also be entirely fluorine substituted, but other relatively stable end groups, such as —$CF_2H$ and —$CONH_2$, may be present, especially in the fluoropolymer present in the primer layer. The perfluoropolymer used in the present invention is melt flowable at the baking temperature, which will generally be in the range of 300° C. to 400° C. Polytetrafluoroethylene, which has a melt viscosity of at least $10^8$ Pa·s at 372° C., would not be melt flowable.

The perfluoropolymers used in the primer layer and the overcoat are melt flowable fluoropolymers. Examples of such melt-flowable fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-8 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Typically these copolymers will have a melt flow rate of 1 to 100 g/10 min as determined by ASTM D-1238 and ASTM tests applicable to specific copolymers (ASTM D 2116-91a and ASTM D 3307).

Melt flowable polytetrafluoroethylene (PTFE), commonly referred to as PTFE micropowder, can also be present in the primer layer or the overcoat along with the melt-fabricable copolymers mentioned above, such micropowder having similar melt flow rate. Similarly, minor proportions of non-melt-fabricable PTFE can be present either in the primer layer or the overcoat, or both. In the primer layer the PTFE aids in stratification towards providing a pure perfluoropolymer in the primer at the primer/overcoat interface. PTFE in the overcoat aids in coating toughness, but should not be used in proportions that detract from the impermeability of the overall lining to corrosive fluids and the protection of the pipe interior surface provided by the lining. In either case, the primer layer and the overcoat, while being polymer blends with either PTFE or multiple melt-flowable perfluoropolymers, are still perfluoropolymers.

In the primer/overcoat embodiment, the overcoat comprises a fluoropolymer. The fluoropolymer could be, but need not be a perfluoropolymer. In this embodiment, the primer layer may also, but not necessarily, be comprise a perflupolymer. In this case, other materials may be used for the primer layer as long as they promote adhesion of the overcoat to the pipe.

The lining may be formed by a number of coating methods, such as application of liquid-based coating composition, application of powder coating, and/or rotolining. In the primer layer/overcoat embodiment, different coating methods may be used for the primer layer and the overcoat. Preferred coating methods include liquid-based coatings for the primer layer and the overcoat, or liquid-based coating for the primer layer and powder coating for the overcoat, or and liquid-based coating for the primer layer and rotolining for the overcoat. The coating is heated to form the lining on the surface of the pipe. The heating is optionally sufficient to bake the lining. This baking consolidates the lining from the dried liquid state or powder state to a solid film state. In the primer layer/overcoat embodiment, the primer layer is baked, and the thickness of the primer layer after baking is no greater than about 25 micrometers (1 mil). In this regard, the term "baking" is used in its broadest sense of achieving the aforesaid consolidation. Sometimes, the term "curing" is used to describe the film-forming effect; "curing" is included within the meaning of the term "baking". Typically, the baking is carried out by simply heating the lining sufficiently above the melting temperature of the material of the lining to cause the respective material to flow and fuse to become a film-like layer. This allows the overcoat to adhere to the primer layer. In the primer layer/overcoat embodiment, this consolidation will generally involve baking of both of the primer layer and the overcoat, either sequentially or simultaneously. Exemplary of the effect of the consolidation, in this embodiment, after the primer layer is baked and consolidated, the thickness of the primer layer after baking is no greater than about 25 micrometers (1 mil).

In the case of rotolining, as will be described below, the layer becomes film-like as it is formed. In the primer layer/overcoat embodiment, the primer layer may only need to be partly consolidated, such as by drying if applied as a liquid-based composition and possibly partially fused, with complete consolidation occurring upon baking of the overcoat.

The overcoat is impermeable to salt water, as well as to the corrosive materials present in the oil and presents a non-stick surface to the oil, whereby the insoluble organic materials present in the oil do not stick to the overcoat lining, and restriction of oil flow and pluggage is minimized or avoided. Because of its non-stick property, however, the overcoat does not adhere to the interior surface of the pipe after contaminants are removed from the interior surface of the pipe. The intervening primer layer provides adhesion both to the overcoat layer and to the interior surface of the pipe. The primer layer by itself does not provide sufficient non-stick character and impermeability to the corrosive materials present in the oil to protect the interior surface of the pipe from corrosion.

In one preferred embodiment where the total coating thickness is relatively small, the overall coating thickness (primer layer thickness plus overcoat thickness) of the lining being no greater than 8 mils (203 micrometers), the interior surface of the pipe is provided with an adherent coating that presents a non-stick surface to the oil and provides a high degree of corrosion protection to the interior surface. In another preferred embodiment, the total coating thickness is relatively thick, the overall lining thickness (primer layer thickness plus overcoat thickness in the primer layer/overcoat embodiment) of the lining is at least 26 mils (660 micrometers).

To insure that a thin overcoat does not have pinholes through which corrosive material may pass to ultimately reach the interior surface of the pipe, the step of forming a lining is preferably carried out by applying multiple coats or layers, one top of one another, where, in the embodiment where the lining comprises a primer layer and an overcoat, the overall thickness of the overcoat is still no greater than 7 mils (175 micrometers), preferably no greater than 6 mils (150 micrometers) in the case of using either liquid-based or powder coating overcoat. The succeeding coating application of the liquid or powder overcoat composition will fill in any pinholes present in the preceding overcoat.

In the primer layer/overcoat embodiment, the liquid basis of the coating composition is preferably organic solvent, which avoids the creation of rust on the cleaned and roughened interior surface of the pipe. Rust would interfere with adhesion of the primer layer to the pipe interior surface The heating of the primer layer composition is sufficient to dry the composition to form the primer layer and may even be sufficient to bake the primer layer, prior to the formation of the overcoat. The liquid basis of the overcoat composition is preferably water, to minimize the need for solvent recovery. In the case of the liquid-based overcoat, following its application to the dried or baked primer layer, the overcoat is dried and then baked at a sufficiently high temperature, depending on the particular composition used, to melt the overcoat composition to be film forming and the composition of the primer layer as well if not already baked, bonding the primer layer to the overcoat. By "liquid-based" is meant that that the coating composition is in the liquid form, typically including a dispersion of perfluoropolymer particles in the liquid, wherein the liquid is the continuous phase. The liquid basis, i.e., the liquid medium can be water or organic solvent. In the case of forming the primer layer, the liquid basis is preferably organic solvent and in the case of the overcoat, the liquid basis is preferably water. Organic solvent may, for example, be present in the overcoat liquid composition in a much smaller amount, e.g., no more than 25% of the total weight of liquid, to improve wetting of the overcoat layer and thereby improve application properties.

When the primer composition is applied as a liquid medium, the adhesion properties described above will manifest themselves upon drying and baking of the primer layer together with baking of the next-applied layer to form the non-stick coating on the pipe. When the primer layer composition is applied as a dry powder, the adhesion property becomes manifest when the primer layer is baked.

In the primer layer/overcoat embodiment, the composition of the primer layer and the overcoat can be the same or different, provided that when baked together, they adhere to one another, and the primer layer adheres to the pipe. When the composition is the same, adequate intercoat adhesion is obtained. In a preferred embodiment, the primer layer and the overcoat both comprise perfluoropolymers. The perfluoropolymers in the primer layer and the overcoat are preferably independently selected from the group consisting of (i) copolymer of tetrafluoroethylene with perfluoroolefin copolymer, the perfluoroolefin containing at least 3 carbon atoms, and (ii) copolymer of tetrafluoroethylene with at least one perfluoro(alkyl vinyl ether), the alkyl containing from 1 to 8 carbon atoms. Additional comonomers can be present in the copolymers to modify properties. Adequate intercoat adhesion is also obtained when one of the perfluoropolymers is copolymer (i) and the other is copolymer (ii). The melting temperature of the lining will vary according to its composition. By melting temperature is meant the peak absorbance obtained in DSC analysis of the lining. By way of example, tetrafluoroethylene/perfluoro(propyl vinyl ether) copolymer (TFE/PPVE copolymer) melts at 305° C., while tetrafluoroethylene/hexafluoropropylene melts at 260° C. (TFE/HFP copolymer). Tetrafluoroethylene/perfluoro(methyl vinyl ether)/perfluoro(propyl vinyl ether) copolymer (TFE/PMVE/PPVE copolymer) has a melting temperature in between these melting temperature. Thus, in one embodiment of the present invention, when the primer layer comprises TFE/PMVE/PPVE copolymer and the perfluoropolymer in the overcoat is TFE/HFP copolymer, the baking of the overcoat may not be at a high enough temperature to bake the primer layer, in which case the primer layer would be heated to the baked condition prior to applying the overcoat to the primer layer. Alternatively, the primer layer can contain the lower melting perfluoropolymer, in which case the baking of the overcoat would also bake the primer layer.

A preferred ingredient in the primer layer, whether the primer is liquid-based or a dry powder, is a heat resistant polymer binder, the presence of which enables the primer layer to adhere to the pipe interior surface. The binder component is composed of polymer which is film-forming upon heating to fusion and is also thermally stable. This component is well known in primer applications for non-stick finishes, for adhering the fluoropolymer-containing primer layer to substrates and for film-forming within and as part of a primer layer. The fluoropolymer by itself has little to no adhesion to a smooth substrate. The binder is generally non-fluorine containing and yet adheres to the fluoropolymer.

Examples of the non-fluorinated thermally stable polymers include polyamideimide (PAI), polyimide (PI), polyphenylene sulfide (PPS), polyether sulfone (PES), polyaryleneetherketone, and poly(1,4(2,6-dimethylephenyl)oxide) commonly known as polyphenylene oxide (PPO). These polymers are also fluorine-free and are thermoplastic. All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyaryleneether-ketones are thermally stable at least 250° C. and melt at temperatures of at least 300° C.

Examples of suitable powder coating compositions comprising perfluoropolymer and polymer binder, wherein these components are associated with one another in multicomponent particles are disclosed in U.S. Pat. Nos. 6,232,372 and 6,518,349.

The polymer binder can be applied as an undercoat to the pipe interior surface after treatment to remove contaminants and an organic solvent solution thereof, prior to application of the primer. The resultant dried thin film of polymer binder can further enhance the adhesion of the primer layer to the pipe interior surface.

For simplicity, only one binder may be used to form the binder component of the composition of the present invention. However, multiple binders are also contemplated for use in this invention, especially when certain end-use properties are desired, such as flexibility, hardness, or corrosion protection. Common combinations include PAI/PES, PAI/PPS and PES/PPS. Typically, the polymer binder content on the primer layer will be from 10-60 wt % based on the combined weight of the perfluoropolymer and polymer binder.

Other ingredients can be present in the primer, such as pigments, fillers, high boiling liquids, dispersing aids, and surface tension modifiers.

The lining composition can be applied to the interior surface of the pipe after removal of contaminants by spraying of the liquid-based composition or dry powder from a nozzle at the end of a tube extending into the interior of the pipe and along its longitudinal axis. The spraying starts at the far end of the pipe and is moved backward along its longitudinal axis as the spray applies the liquid-based coating, until the entire interior surface is coated. The tube having the spray nozzle at its end is supported along its length and positioned axially within the pipe by sled elements positioned along the length of the tube. As the tube and its nozzle is retracted from the pipe, the sled elements slide along the interior surface of the pipe, leaving the underlying interior surface open to receive the sprayed coating. The dry powder primer can be sprayed using an electrostatic sprayer; electrostatic spraying is conventional in the dry powder coating art.

The preferred liquid which enables the lining composition to be a liquid is one or more organic solvents, within which the perfluoropolymer, present as particles in the preferred embodiment, is dispersed and the polymer binder present either as dispersed particles or in solution in the solvent. The characteristics of the organic liquid will depend upon the identity of the polymer binder and whether a solution or dispersion thereof is desired. Examples of such liquids include N-methylpyrrolidone, butyrolactone, methyl isobutyl ketone, high boiling aromatic solvents, alcohols, mixtures thereof, among others. The amount of the organic liquid will depend on the flow characteristics desired for the particular coating operation.

The solvent should have a boiling point of 50 to 200° C., so as not to be too volatile at room temperature, but to be vaporized at reasonable elevated temperatures, less than the baking temperature of the perfluoropolymer. In the primer layer/overcoat embodiment, the thickness of the primer layer is established by experience with the particular primer composition selected and polymer binder concentrations and the relative amount of solvent that is present. Preferably the primer contains 40 to 75 wt % solvent based on the combined weight of solvent, polymer and polymer binder.

In an alternate embodiment, a powder overcoat is applied by rotolining. J. Scheirs, Modern Fluoropolymers, John Wiley & Sons (1997) describes the rotolining process, which involves the adding of sufficient fluoropolymer in powder form to a steel vessel to coat the interior surface of the vessel with the desired thickness of the fluoropolymer, followed by rotating the vessel in three dimensions in an oven, to melt the fluoropolymer, whereby the fluoropolymer covers the interior surface of the vessel and forms a seamless lining (p. 315). In the preferred method of this embodiment, the primer is heated sufficiently to both dry and bake the coating prior to rotolining. When the overcoat is a rotolining, the preferred thickness of the lining is 30-220 mils (762-5588 micrometers), preferably 30-100 mils (762-2540 micrometers).

EP 0 226 668 B1 discloses the preparation of rotolining particles of TFE/perfluoroalkyl vinyl ether (PAVE) in which the vinyl ether comonomer contains 3 to 8 carbon atoms, disclosing particularly perfluoro(methyl vinyl ether), perfluoro(propyl vinyl ether), and perfluoro(heptyl vinyl ether). Such particles can be used in this invention. The TFE/PAVE copolymer particles used in the present invention can also be made by other processes, for example the melt extrusion of the copolymer and cutting of the extrudate into minicubes as disclosed in U.S. Pat. No. 6,632,902. The average particle size of the copolymer particles used for rotolining in the present invention is preferably about 100 to 3000 μm, more preferably about 400 to 1100 μm.

The rotolining method of forming the lining can be used to form both the primer and overcoat layers. When forming the primer, it is preferred that the fluoropolymer primer composition also contain a finely divided metal additive such as Zn or Sn in an amount of about 0.2 to 1 wt % based on the combined weight of the metal powder and fluoropolymer. This additive, in place of polymer binder, enables the rotolining primer to adhere to the pipe interior surface. Because it is more economical to form a thin primer layer by using a liquid-based primer composition, it is preferred that the roto-lining technique be used for the formation of the overcoat layer, especially when a thick overcoat is desired, such as described above.

The overcoat can also be applied as a liquid perfluoropolymer composition, i.e., powder particles having an average particle size of 2 to 60 micrometers dispersed or solubilized in an organic solvent or dispersed in aqueous media. However, the overcoat is preferably applied as a powder composition by means of known spray devices such as by electrostatic spraying. The overcoat does not require any ingredient therein to promote adhesion to the interior surface of the oil pipe, because the primer layer provides this adhesion and adhesion to the overcoat. Therefore the overcoat composition applied to the primer layer can be essentially free of any other ingredient, preferably providing a pure perfluropolymer interior surface facing the oil in the oil pipe, to provide the best non-stick surface.

In another embodiment, the lining comprises a barrier layer which includes a plurality of particles which form a mechanical barrier against permeation of water, solvents and/or gases to the pipe. The barrier layer has a typical thickness of about 1 to about 10 mils (25-254 micrometers). Preferably the barrier layer comprises a fluoropolymer and a platelet shaped filler particle that are relatively inert to chemical attack. The particles form a mechanical barrier against permeation of water, solvent and oxygen to the substrate and are present in the amount of about 2 to about 10% by weight based on the total dry weight of the barrier layer. In spray application, the particles tend to align parallel to the interior surface of the pipe. Since oxygen, solvent and water cannot pass through the particles themselves, the presence of aligned particle particles further reduces the rate permeation through the lining which is formed.

Examples of typical platelet shaped filler particles include mica, glass flake and stainless steel flake. It is also within the scope of this invention that the lining may contain platelet shaped filler particles with or without the presence of an intermediate barrier layer.

The platelet shaped particles of filler component of the barrier layer are preferably mica particles, including mica particles coated with an oxide layer like iron or titanium oxide. These particles have an average particle size of about 10 to 200 microns, preferably 20-100 microns, with no more than 50% of the particles of flake having average particle size of more than about 300 microns. The mica particles coated with oxide layer are those described in U.S. Pat. No. 3,087,827 (Klenke and Stratton); U.S. Pat. No. 3,087,828 (Linton); and U.S. Pat. No. 3,087,829 (Linton).

The micas described in these patents are coated with oxides or hydrous oxides of titanium, zirconium, aluminum, zinc, antimony, tin, iron, copper, nickel, cobalt, chromium, or vanadium. Mixtures of coated micas can also be used.

In the primer layer/overcoat embodiment, when a barrier layer is used, the overcoat includes a multiple coating of a first-applied coating on the primer layer to form a lower layer of the overcoat of a fluoropolymer, preferably perfluoropolymer, composition containing a small amount of mica dispersed therein, followed by a subsequent applied coating on the perfluoropolymer/mica lower layer of fluoropolymer, preferably perfluoropolymer, to form a perfluoropolymer upper layer that is free of mica. Each of these layers can be applied by powder coating or by liquid coating. Further details on the perfluoropolymer/mica composition is disclosed in U.S. Pat. No. 5,972,494, wherein it is disclosed that the mica constitutes 2 to 15 wt % of the composition and 0.5 to 1.5 wt % of talc may also be present. For purposes of the present invention, these percents refer to the combined weight of the perfluoropolymer and the mica and the talc, if present. The presence of this lower layer further improves the impermeability performance of the lining when the corrosive conditions in particular oil wells require enhanced protection of the oil pipe.

In the preformed film embodiment, a preformed film liner is inserted in the pipe, instead of coating the pipe with a lining. The use of preformed film enables a relatively thick lining of uniform thickness to be formed. The preformed film is sufficiently thick and defect free so as to minimize the passage of corrosive material to the interior surface of the pipe.

The preformed film does not adhere to the interior surface of the pipe, so a primer layer is used with this embodiment. The intervening primer layer as described above provides adhesion both to the preformed film and to the interior surface of the pipe. However, the primer layer by itself does not provide sufficient nonstick character and impermeability to the corrosive materials present in the oil to protect the interior surface of the pipe from corrosion. The use of both a primer and a preformed film liner has the benefit of providing good adhesion to the interior metal surface yet allowing for the desirable thickness a preformed film in particular can provide.

The preformed film is preferably made of a fluoropolymer. The presence of fluoropolymer in the preformed film provides both excellent impermeability and nonstick character. The primer layer may also comprise a fluoropolymer. The presence of fluoropolymer in the primer layer enables the preformed film to fusion bond to the primer layer in the carrying out of the baking step.

The fluoropolymer in the primer layer, barrier layer and preformed film is independently selected from the group of polymers and copolymers of trifluoroethylene, hexafluoropropylene, monochlorotrifluoroethylene, dichlorodifluoroethylene, tetrafluoroethylene, perfluorobutyl ethylene, perfluoro(alkyl vinyl ether), vinylidene fluoride, and vinyl fluoride and blends thereof and blends of said polymers with a non-fluoropolymer. The fluoropolymers used in this invention are preferably melt-processible. By melt-processible it is meant that the polymer can be processed in the molten state (i.e., fabricated from the melt into shaped articles such as films, fibers, and tubes etc. that exhibit sufficient strength and toughness to be useful their intended purpose). Examples of such melt-processible fluoropolymers include copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Such fluoropolymers include polychlorotrifluoroethylene, copolymers of tetrafluoroethylene (TFE) or chlorotrifluoroethylene (CTFE). Preferred comonomers of TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The melt-processible copolymer is made by incorporating an amount of comonomer into the copolymer in order to provide a copolymer which typically has a melt flow rate of about 1-100 g/10 min as measured according to ASTM D-1238 at the temperature which is standard for the specific copolymer. Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Additional melt-processible fluoropolymers are the copolymers of ethylene or propylene with TFE or CTFE, notably ETFE, ECTFE, PCTFE, TFE/ETFE/HFP (also known as THV) and TFE/E/HFP (also known as EFEP). Further useful polymers are film forming polymers of polyvinylidene fluoride (PVDF) and copolymers of vinylidene fluoride as well as polyvinyl fluoride (PVF) and copolymers of vinyl fluoride.

While the fluoropolymer component is preferably melt-processible, polytetrafluoroethylene (PTFE) including modified PTFE which is not melt-processible may be used together with melt-processible fluoropolymer or in place of such fluoropolymer. By modified PTFE is meant PTFE containing a small amount of comonomer modifier which improves film forming capability during baking (fusing), such as perfluoroolefin, notably hexafluoropropylene (HFP) or perfluoro(alkyl vinyl) ether (PAVE), where the alkyl group contains 1 to 5 carbon atoms, with perfluoro(ethyl vinyl) ether (PEVE) and perfluoro(propyl vinyl) ether (PPVE) being preferred. The amount of such modifier will be insufficient to confer melt fabricability to the PTFE, generally no more than 0.5 mole %. The PTFE, also for simplicity, can have a single melt viscosity, usually at least $1\times10^9$ Pa·s, but a mixture of PTFE's having different melt viscosities can be used to from the fluoropolymer component. Such high melt viscosity indicates that the PTFE does not flow in the molten state and therefore is not melt-processible.

The fluoropolymers in the primer layer, preformed film and barrier layer can be the same or different, provided that when baked together, they adhere to one another. The fluoropolymer in the primer layer and barrier layer used in this invention is preferably independently selected from melt processible fluorinated ethylene/propylene copolymer, ethylene/tetrafluoroethylene copolymer, and tetrafluoroethylene/perfluoro(alkyl vinyl ether) copolymer. The fluoropolymer in the preformed film of this invention is preferably selected from polyvinyl fluoride(PVF), fluorinated ethylene/propylene copolymer, ethylene/tetrafluoroethylene copolymer, tetrafluoroethylene/perfluoro(alkyl vinyl ether) copolymer, polyvinylidene fluoride and a blend of polyvinylidene fluoride and an acrylic polymer, preferably nonfluoropolymer acrylic polymer.

As in the coating embodiment as described above, a preferred ingredient in the primer is a heat resistant polymer binder, the presence of which enables the primer layer to adhere to the interior surface of the pipe. The binder component is composed of polymer which is film-forming upon heating to fusion and is also thermally stable. This component is well known in primer applications for nonstick finishes, for adhering the fluoropolymer-containing primer layer to substrates and for film-forming within and as part of a primer layer. The fluoropolymer by itself has little to no adhesion to the interior surface of the metal pipe. The binder is generally non-fluorine containing and yet adheres to the fluoropolymer.

Examples of the non-fluorinated thermally stable polymer binders include polyamideimide (PAI), polyimide (PI), polyphenylene sulfide (PPS), polyether sulfone (PES), polyarylene-etherketone, polyetherimide, and poly(1,4(2,6-dimethylephenyl)oxide) commonly known as polyphenylene oxide (PPO). These polymers are also fluorine-free and are thermoplastic. All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyaryleneetherketones are thermally stable at least 250° C. and melt at temperatures of at least 300° C. When the primer composition is applied as a liquid medium, the adhesion properties described above will manifest themselves upon drying and baking of the primer layer together with baking of the next applied layer of fluoropolymer to form the nonstick coating of the substrate.

The polymer binder can be applied as an undercoat to the pipe interior surface after treatment to remove contaminants and a solvent solution thereof, prior to application of the primer. The resultant dried thin film of polymer binder can further enhance the adhesion of the primer layer to the pipe interior surface.

For simplicity, only one binder resin may be used to form the binder component of the primer composition of the present invention. However, multiple binder resins are also contemplated for use in this invention, especially when certain end-use properties are desired, such as flexibility, hardness, or corrosion protection. Common combinations include PAI/PES, PAI/PPS and PES/PPS.

Other ingredients can be present in the primer, such as pigments, fillers, high boiling liquids, dispersing aids, and surface tension modifiers.

The primer layer is preferably liquid-based. The liquid basis of the primer coating is preferably an organic solvent. Although water-based primers may be used in some applications, the use of solvent deters the creation of rust on the interior surface of the pipe which may interfere with adhesion of the primer layer to the surface of the pipe.

The preferred liquid which enables the primer to be a liquid composition is one or more organic solvents, within which the fluoropolymer, present as particles, are dispersed and the polymer binder present either as dispersed particles or in solution in the solvent. The characteristics of the organic liquid will depend upon the identity of the polymer binder and whether a solution or dispersion thereof is desired. Examples of such liquids include N-methylpyrrolidone, butyrolactone, methyl isobutyl ketone, high boiling aromatic solvents, alcohols, mixtures thereof, among others. The amount of the organic liquid will depend on the flow characteristics desired for the particular coating operation.

The solvent should have a boiling point of 50 to 200° C., so as not to be too volatile at room temperature, but to be vaporized at reasonable elevated temperatures, less than the baking temperature of the fluoropolymer. The thickness of the primer layer coating is established by experience with the particular primer composition selected, including its fluoropolymer and polymer binder concentrations and the relative amount of solvent that is present. The primer layer of the oil pipe preferably has a thickness of in the range of 5-100 micrometers, preferably 10-30 micrometers. Preferably the primer contains 40 to 75 wt % solvent based on the combined weight of solvent, fluoropolymer and polymer binder.

Powder coatings may also be used for the primer layer in the preformed film embodiment. Examples of suitable powder coating compositions comprising perfluoropolymer and polymer binder, wherein these components are associated with one another in multicomponent particles are disclosed in U.S. Pat. Nos. 6,232,372 and 6,518,349. When the primer is applied as a dry powder, the adhesion property becomes manifest when the primer layer is baked.

When a non-melt-processible fluoropolymer is used for the preformed liner, the liner can be made, for example, by methods including paste extrusion as described in U.S. Pat. No. 2,685,707. In paste extrusion, a paste extrusion composition is formed by mixing PTFE fine powder with an organic lubricant which has a viscosity of at least 0.45 centipoise at 25° C. and is liquid under the conditions of subsequent extrusion. The PTFE soaks up the lubricant, resulting in a dry, pressure coalescing paste extrusion composition that is also referred to as lubricated PTFE fine powder. During paste extrusion which is typically performed at a temperature of 20 to 60° C., the lubricated fine powder is forced through a die to form a lubricated green extrudate. The lubricated green extrudate is then heated, usually at a temperature of 100 to 250° C., to make volatile and drive off the lubricant from the extrudate. In most cases, the dried extrudate is heated to a temperature close to or above the melting point of the PTFE, typically between 327° C. and 500° C., to sinter the PTFE.

Alternatively, granular PTFE can be isostatically molded or ram extruded into a tubular liner and fitted into a pipe housing to form the preformed liner. In this embodiment, the liner is processed to a size somewhat larger than the inner diameter (I.D.) of the steel housing into which it is being installed. The thickness is typically 50-120 mil. The liner is preferably pulled through a reduction die into a pipe that has either an adhesive applied thereto. A programmed heating cycle relaxes the liner inside the steel housing, resulting in a snug liner fit.

The preformed film is preferably in the shape of tubular liner with the outer diameter of the tube being greater than the interior diameter of the pipe to be lined. In a preferred embodiment the initial outer diameter of said tubular liner is about 10 to 15% greater than the inner diameter of the pipe. In a more preferred embodiment, the tubular liner is applied to the interior surface of the pipe according to the teachings of U.S. Pat. No. 3,462,825 (Pope et al.) by gripping one end of the liner, pulling the liner into the oil pipe through a reduction die (or reducing the outer diameter through some other mechanical means), releasing the liner and allowing the liner to expand into tight engagement with the primer layer (or barrier layer, if present) of the interior surface of the pipe. The pipe is subsequently baked to insure fusion bonding of the liner to the primer layer which adheres to the interior surface of the pipe. The baking of the primer layer (and barrier layer if present) and the fusion bonding of this layer to the preformed film is carried out by placing the pipe in an oven and heating the entire pipe sufficiently to cause baking and or fusion bonding to occur.

Although Pope et al. have previously described manufacturing a pipe with a fluoropolymer liner, there are deficiencies in those teaching when trying to apply them to pipes of this invention. The lining applied in this way may not be tight and therefore pressure drops in the use of the lined pipe may cause the lining to buckle pulling away from the interior surface allowing accumulation of gases and liquids between the liner and the wall surface and narrowing the path of oil flow. With the present invention, such buckling is prevented because of the presence of a primer layer on the pipe's interior surface bonding the film to the interior surface. It is unexpected that the fluoropolymer film adheres to the primer coating. The bonding of the film to the primer layer involves the heating of the pipe sufficiently to melt the primer/film interface and then cooling the pipe. The film has a greater shrinkage during cooling than the pipe, which would tend to pull the film away from the primer layer. Nevertheless, the bond achieved in the molten condition remains intact, resulting in the film forming a lining that is bonded to the pipe through the intervening primer (or barrier) layer. The expansion of the film during the heating step, while theoretically greater than the expansion of the pipe, is limited by the relaxation effect of the heating of the film to the molten or near molten condition. The shrinkage of the film during cooling starts from this relaxed condition and then outpaces the shrinkage of the pipe. Under this condition, it is surprising that the molten bond retains its integrity during cooling. In a the present invention, the expansion fit of the Pope et al. approach for lining a pipe is replaced by a fusion bonded liner that resists separation and buckling characteristic of unbonded liners.

Further according to the present invention, an exterior lining is formed on the exterior surface of the pipe. The amount and the type of lining on the exterior of the pipe is determined by the temperature and chemical makeup of the fluids to be transported. For instance, if the product has a substantial portion of its constituents that would crystallize or form hydrates, or in another way come out of the fluid at temperatures below the temperatures coming out of the wellhead, then the product must be desirably kept above the temperature at which crystallization would occur. Even if the product is substantially devoid of such constituents, but would rise in viscosity at temperatures approaching that of the lower ambient environment, it is advantageous to reduce of eliminate the viscosity rise by the use of an exterior lining. In addition, there may be other reasons or combinations of reasons to insulate pipes and pipelines. For instance, in particularly corrosive subsea environments, it may be desirable to use a lining on the exterior of the pipe to protect against corrosion.

The exterior lining may comprise a fluoropolymer coating, such as described above for the interior of the pipe, and in particular, a perfluoropolymer coating, or it may comprise a preformed film, as described above. In addition, the exterior lining may comprise a urethane foam, a polyurethane foam, hollow glass microspheres, or epoxies, such as in powder coating form, maleic anhydride, or any material which demonstrates excellent adhesion, resistance to thermal and mechanical shock, and excellent chemical and physical resistance in a wide range of crude and refined petroleum products. The exterior lining may be a two-part or layer system, or a one-part of layer system. In particular, epoxies are used in a two-part system, and maleic anhydride is used in a one-part system. In addition, adhesive and tape (e.g., vinyl or polyethylene), wrapping, powder coatings, extruded plastic (such as polyurethane, polyolefins, vinyl and the like) extruded elastomers (ethylene propylene rubber, butyl rubber, nitrite rubber, polychloropropene rubber and the like) and combinations of these techniques, as disclosed in U.S. Pat. No. 6,397,895. A non-woven material with an interspersed gel for wrapping pipes is disclosed in U.S. Patent Application Publication No. 2002/0094426 is also suitable for the exterior lining of the present invention.

The total thickness of the exterior lining may be greater than or equal to 2 mils, up to about 100 mils. This thickness may be achieved by one or more layers. These layers may be the same or different thicknesses. The thickness of the exterior lining can be tailored to a specific service, as described above with respect to the thickness of the interior coating. The temperature differences between the environment and the fluid product, as well as the temperature at which the fluid product is desired to be maintained or deliver, will be determinative of the amount of exterior insulation, as well thickness and/or number of lining layers and primer and overcoat used. By thickness is meant not only total thickness, but also the number of layers making up the total thickness. These layers may be equal or unequal in their thickness.

According to a novel aspect of the present invention, different combinations of the above-described coatings or linings may be used different sections of pipe, depending on the demands of the environment. For instance, a fluoropolymer may be used in the lower region of an oil well, where asphaltenes deposit. FEP may be used in coated sections to inhibit paraffin deposit in the upper 1500 feet of a well. Where scale is a problem a different fluoropolymer may be used. Epoxy may be used in the sections of pipes in areas where plugging is not as much of a problem but where corrosion is an issue. In addition, various sections of the pipe system may be insulated on the exterior to inhibit corrosion, especially in off shore piping system.

Also, depending on the environment in which the pipes are used, different thicknesses may be used to coat the interior surface of the pipes in different zones. For instance, in particularly corrosive environments, thicker linings are desired. In such circumstances, it may be useful to provide a preformed lining instead of a coating system.

A pipe is lined according to the present invention as follows. Preferably the interior surface of the pipe is subjected to cleaning and/or grit-blasting to improve adhesion of the fluoropolymer lining to the interior surface. The interior surface of the oil pipe, as manufactured is generally smooth but with peaks and valleys and is generally coated with preservative to minimize any rusting. Before applying the fluoropolymer lining on the pipe interior surface, such surface is typically cleaned to remove the preservative. Conventional soaps and cleansers can be used. The pipe can be further cleaned by baking at high temperatures in air, temperatures of 800° F. (427° C.) or greater. The cleaned interior surface is then preferably grit blasted, with abrasive particles, such as sand or aluminum oxide, to form a roughened surface to improve the adhesion of the primer layer. The grit blasting is sufficient to remove any rust that may be present. The roughening that is desired for primer layer adhesion can be characterized as a roughness average of 70-250 microinches (1.8-6.4 micrometers).

In a preferred embodiment, where a primer layer and overcoat is used, the primer is applied to the cleaned, grit-blasted interior surface of the pipe by spraying a liquid-based composition from a nozzle at the end of a tube extending into the interior of the pipe and along its longitudinal axis. The primer is preferably applied to a heated pipe in order to prevent running, dripping and sagging.

Typically the pipe is preheated to 110-125° F. (43-52° C.) but higher temperatures may be used providing that they are about 20° F. below the boiling point of the solvent of the composition. The spraying starts at the far end of the pipe and is moved backward along its longitudinal axis as the spray applies the liquid-based coating, until the entire interior surface is coated. The tube having the spray nozzle at its end is supported along its length and positioned axially within the pipe by sled elements positioned along the length of the tube. As the tube and its nozzle is retracted from the pipe, the sled elements slide along the interior surface of the pipe, leaving the underlying interior surface open to receive the sprayed coating.

The lining is applied to the interior surface of a pipe according to a preferred embodiment of the present invention, where a primer layer and overcoat are applied, as follows. The primer can be applied to the interior surface of the pipe after removal of contaminants by spraying of the liquid-based composition or dry powder from a nozzle at the end of a tube extending into the interior of the pipe and along its longitudinal axis. The spraying starts at the far end of the pipe and is moved backward along its longitudinal axis as the spray applies the liquid-based coating, until the entire interior surface is coated. The tube having the spray nozzle at its end is supported along its length and positioned axially within the pipe by sled elements positioned along the length of the tube.

As the tube and its nozzle is retracted from the pipe, the sled elements slide along the interior surface of the pipe, leaving the underlying interior surface open to receive the sprayed coating. The dry powder primer can be sprayed using an electrostatic sprayer; electrostatic spraying is conventional in the dry powder coating art.

After application of the primer to the interior surface of the pipe, the tube and nozzle are removed and the pipe is subjected to a heating step to at least dry the primer to form the primer layer. Typically, the pipe will be placed in an oven heated to an elevated temperature to vaporize the solvent or to heat the pipe and its primer layer to a higher temperature, above the melting temperature of the primer layer to bake the primer layer.

After the heating step, the overcoat is spray-applied as a liquid-based composition or as a dry powder onto the primer layer, using a tube supported by sled elements and nozzle similar to that used to apply the primer. It has been found that mere drying of the liquid-based primer to form the primer layer may give the layer adequate integrity to withstand, i.e. not be removed by, the sliding of the sled elements across the primer layer surface as the tube/spray nozzle are retracted during spraying of the liquid-based overcoat. To accomplish multiple applications of the overcoat to the primer layer, the overcoat applied in one spray application is baked so that the subsequent spay application can be carried out without the sled elements scaring or otherwise removing overcoat from the preceding application. In the case of the overcoat being a dry powder, the resultant powder coating should be baked before the next spray application of dry powder if greater coating thickness is desired.

When the primer composition is applied as a liquid medium, the adhesion properties described above will manifest themselves upon drying and baking of the primer layer together with baking of the next-applied layer to form the non-stick coating of the substrate. When the primer is applied as a dry powder, the adhesion property becomes manifest when the primer layer is baked.

The pipe is then baked to melt the overcoat, again by placing the pipe in an oven heated to the desired temperature. Typically, the baking temperature applied to the overcoat through the thickness of the wall of the pipe and the primer layer, will be at least 20° C. above the melting point of the overcoat, with the temperature and time of exposure being sufficient to bake the overcoat. The same is true with respect to the baking of the primer layer.

The heating of the primer coating is sufficient to dry the coating to form the primer layer and may even be sufficient to bake the primer layer, prior to application of the preformed film. By "baking" is meant that the fluoropolymer layer is heated sufficiently at a temperature above its melting temperature to cause the fluoropolymer to flow and form a continuous film-like layer. By melting temperature is meant the peak absorbance obtained in DSC analysis of the fluoropolymer. The barrier layer if used is applied in the same way as the primer layer and may be heated with the primer layer or applied to a dry primer layer and then heated to drying or baking prior to application of the lining.

By "fusion bonding" is meant that the pipe is heated sufficiently to melt bond the overcoat or preformed film to the primer layer or intervening barrier layer. That is to say, that the primer/overcoat or film interface, or the interfaces of the primer layer/barrier layer/overcoat or preformed film as the case may be, are melted together sufficiently to adhere the overcoat firmly to the layer(s). Fusion bonding temperatures are dependent on the particular fluoropolymer present in the or overcoat or preformed film. For PFA or FEP, the pipe is heat (baked) by conventional means to a temperature between 600 to 700° F. (315 to 371° C.). For ETFE, the pipe is heated by conventional means to a temperature between 550° to 630° F. (228 to 332° C.). Time for fusion bonding will be dependent on the baking temperature used but is typically from 5 minutes to 60 minutes. Baking time and temperature must be sufficient to achieve a firm melt bond between the overcoat or preformed film and the primer or barrier layer. As the pipe cools, there is a tendency for the preformed film to shrink. Unexpectedly, the intercoat bonding between the primer layer (and barrier layer, if present) and the overcoat or preformed film is sufficient to prevent the film from pulling away from the primer layer or barrier layer.

The melting temperature of the lining will vary according to its composition. By melting temperature is meant the peak absorbance obtained in DSC analysis of the lining. By way of example, tetrafluoroethylene/perfluoro(propyl vinyl ether) copolymer (TFE/PPVE copolymer) melts at 305° C., while tetrafluoroethylene/hexafluoropropylene melts at 260° C. (TFE/HFP copolymer). Tetrafluoroethylene/perfluoro(methyl vinyl ether)/perfluoro(propyl vinyl ether) copolymer (TFE/PMVE/PPVE copolymer) has a melting temperature in between these melting temperature. Thus, in one embodiment of the present invention, when the primer layer comprises a perfluoropolymer which is TFE/PMVE/PPVE copolymer and the overcoat comprises a perfluoropolymer which is TFE/HFP copolymer, the baking of the overcoat may not be at a high enough temperature to bake the primer layer, in which case the primer layer would be heated to the baked condition prior to applying the overcoat to the primer layer. Alternatively, the primer can contain the lower melting perfluoropolymer, in which case the baking of the overcoat would also bake the primer layer.

The exterior lining is formed on the exterior surface of the pipe after the interior lining is formed. The exterior lining may be wrapped around the exterior of the pipe, or in the case of a preformed exterior liner, may be slipped over the pipe.

The resultant pipe has a continuous adherent lining on its interior surface, with the exposed surface of the lining, which is preferably perfluoropolymer, providing a non-stick surface for oil to eventually flow through the pipe and for its constituents. The lining follows the peaks and valleys of the interior surface of the pipe and to some extent fills them in with the primer and overcoat layers. The lining both acts as a non-stick surface for the oil and its constituents, but also to isolate the steel structure of the pipe from corrosion. The interior lining provides a degree of insulation to the pipe. The exterior lining provides an additional degree of insulation.

The use of different systems of pipe according to the present invention provides a degree of flexibility, so that different combinations of the above-described coatings or linings may be used different sections of pipe, depending on the demands of the environment. This provides for improved pluggage reduction and corrosion resistance. In addition because certain sections of pipe need not be lined at all, this reduces the cost associated with designing a pipes for oil wells or for oil conveying systems.

The pipes of the present invention are able to withstand conditions as high s 350° F. (177° C.) and 20,000 psi (138 MPa) present in some high temperature/high pressure reserves. The invention is also applicable to pipe used in the Chemical Processing Industry (CPI), especially in those applications where temperatures such as those described above are encountered. In the CPI temperatures of at least about 350° F. (177° C.) and even as high as 400° F. (204° C.) are used. The pipes show superior permeation resistance to corrosive chemicals due to both to their construction, i.e., especially when a primer layer and overcoat or primer layer and preformed film liner are used, and especially with an optional intervening barrier layer, and their strong adherence to the interior surface of the pipe with the aid of a primer. In prior art systems where only a film liner is present, gas is able to permeate through the film to both corrode the pipe and to exert pressure on the film from the metal interface side of the film. This results in blistering at the metal interface and eventual buckling of the film to constrict and possibly block the interior of the pipe. In particular, in the preformed liner embodiment of the present invention, pipes of the present invention are able to deter the permeation of gases and vapors and resist the accumulation of chemicals at the interface of the metal and primer/film greatly retarding catastrophic failure. The lined pipes of the present invention are able to withstand the above described conditions for continuous service, e.g., for at least 30 days, preferably at least 60 days, and more preferably at least 12 months.

Because of all the above-noted advantages, the present invention is capable of reducing the deposition of at least one of asphaltenes, paraffin wax and inorganic scale by at least 40%, preferably at least 50%, as compared to the interior surface of said oil pipe without said lining being present. These reductions are also made in comparison to pipe lined with only an epoxy resin on the interior surface of the pipe.

In fact, reductions of at least 60%, 70%, 80% and even at least 90% have been realized. Preferably these reductions apply to at least two of the deposition materials, and more preferably, to all three of them. Thus, in accordance with the present invention, there is also provided a method for reducing the deposition in a rigid oil well pipe of at least one of asphaltenes, paraffin wax, and inorganic scale by at least 40% as compared to the interior surface of said oil pipe without the liner being present. In addition, the preformed liner provides corrosion protection to the interior surface of the pipe.

In use, the pipes are assembled together, end to end, by conventional techniques dependent on the utility. The type of lining that is used in each pipe or section of pipe is tailored according to the demands of the system in accordance with the present invention. In oil wells pipes will typically have screw sections at each end so that length after length of coated pipe can be screwed together to reach the depth of the oil well. The lining will be applied to abutting ends of the screw threads so that when screwed together, the succession of pipes present a continuous non-stick surface to the oil. For oil pipelines, the pipes may have flanges for bolting together to form the continuous succession of pipes required. In that case, the coating of the interior surface of the pipe is extended to the surface of the flange so that the butting together of the flanges adds to the continuity of the coating on the interior surface of the pipes.

Test Methods

Paraffin Deposition Test

A cold finger apparatus, available at Westport Technology Center International (Houston, Tex.) is used to test the baked coatings as prepared in the Examples for the degree of release (non-stick) they exhibit. The apparatus includes a circulating beaker (double-walled) filled with mineral oil and connected to a first temperature bath which is placed on a magnetic mixing plate. A stainless steel cup with a magnetic stirring bar is submerged in the mineral oil and the temperature set to 140° F. (60° C.). A cold finger (tubular projection) is connected to a second water circulating temperature bath, and the temperature set to 60° F.

Stainless steel sleeves (6" long, 0.5" inside ID, 0.625" OD) closed flat at the bottom which are coated as described in the Examples are washed with solvent (toluene, then methanol) and placed in a hot oven to ensure a clean surface for wax to deposit on. The sleeve is then weighed, secured over the finger with a set screw at the top to create a tight fit, and allowed to cool for thirty minutes. After thirty minutes, the sleeve is attached over the cold finger in a tight fit and submerged in the crude oil for twenty-four hours.

Crude oil known to have a large wax content with a wax appearance temperature of approximately 105° F. is used for this test. The crude is initially heated to 150° F. (66° C.) and centrifuged twice to remove any water and sediments. The source sample of crude was maintained at 150° F. (66° C.) during the duration of the testing to ensure the wax remained in solution.

At the completion of the twenty-four hour test time, the sleeve is removed from the crude and allowed to sit for one hour at 60° F. (16° C.) in a nitrogen environment. A final weight is measured. Weight data collected before and after submersion are used to calculate the wax deposition on the sleeve. From the material balance a mass per unit area was calculated for comparison purposes. The baseline for comparison is the paraffin adhesion test performed on commercially available epoxy-resin coated oil pipe, wherein the deposition of paraffin on the epoxy resin coating amounted to 0.0652 g/cm$^2$.

Adhesion Tests

Test panels of cold rolled steel 4.0"×12.0" (10.1 cm×30.5 cm) panels are cleaned with an acetone rinse. The panel has a grit blast surface. The panels are coated according to the description in each of the examples. The panels are subjected to the following two adhesion tests.

(1) Post Boiling Water Fingernail Adhesion (PWA)

Coated test panels are submerged in boiling water for 20 minutes. The water is allowed to come to a full boil after inserting the coated panel, before timing is begun. After the boiling water treatment, the panel is cooled to room temperature and dried thoroughly. The fingernail scratch test involves the use of the fingernail, to chip or peel away the coating from the edge of a deliberate knife scratch in the film, to test the degree of adhesion of the film. If the coating can be pulled away from the substrate for 1 cm or more, the coating is considered to fail the PWA test. If the coating cannot be pulled loose for a distance of 1 cm, the coating is considered to pass the PWA test.

(2) Cross-Hatch Adhesion

Coated substrates are subjected to a cross-hatch (x-hatch) test for adhesion. The coated sample is scribed with a razor blade, aided by a stainless steel template, to make 11 parallel cuts about 3/32 inch (2.4 mm) apart through the film to the metal surface. This procedure is repeated at right angles to the first cuts to produce a grid of 100 squares. The coated and scribed sample is immersed in boiling water for 20 minutes, and then is removed from the water and cooled to room temperature without quenching the sample. Then a strip of transparent tape (3M Brand No. 898), 0.75 by 2.16 inch (1.9 by 5.5 cm), is pressed firmly over the scribed area with the tape oriented in a parallel direction to the scribed lines. The tape is then pulled off at a 90° angle rapidly but without jerking. This step is repeated at a 90° angle to the first step with a fresh piece of tape, and then repeated two times more again at 90° angles to the previous step, each time with a fresh piece of tape. Passing the test requires that no squares be removed from the 100-square grid.

Examples

The following Examples illustrate the effects of the present invention on coupons which are coated with interior coatings according to the present invention.

In the following Examples, substrates for coating are cleaned by baking 30 min @ 800° F. (427° C.) and grit blasted with 40 grit aluminum oxide) to a roughness of approximately 70-125 microinches Ra. Liquid coatings are applied by using a spray gun, Model Number MSA-510 available from DeVilbiss located in Glendale Heights, Ill. Powder coatings are applied by using Nordson manual electrostatic powder spray guns, Model Versa-Spray I located in Amhearst, Ohio.

For determining the degree of release of the coatings, the substrate being coated is a stainless steel sleeve suitable for use in the apparatus described above in the Paraffin Deposition Test.

For determining the adhesion quality, the substrate being coated is a carbon steel panel suitable for use in the PWA Test and the Cross-Hatch Adhesion Test described above.

The primer layers formed in the Examples have the following pre-bake compositions:

TABLE 1

Liquid Primers

| Ingredient | Primer 1 wt % | Primer 2 wt % | Primer 3 wt % |
|---|---|---|---|
| Fluoropolymer | | | |
| FEP | 12.5 | | 10.9 |
| ETFE | | 20.7 | |
| Polymer binder | | | |
| Polyamideimide | 1.1 | 3.7 | 11.9 |
| Polyethersulfone | 7.6 | | |
| Polyphenylene Sulfide | | 3.4 | |
| Solvents | | | |
| NMP* | 47.8 | 1.9 | 40.7 |
| Other Organics** | 20.1 | 4.7 | 32.0 |
| Water | | 60.2 | |
| Pigments | 9.9 | 4.2 | 1.7 |
| Dispersing Agent | 1.0 | 1.2 | 2.8 |
| Total | 100 | 100 | 100 |

*NMP is N-methyl-2-pyrrolidone
**Other organics may include solvents such as MIBK (methyl isobutyl ketone), hydrocarbons such as heavy naphtha, xylene etc., furfuryl alcohol, triethanol amine or mixtures thereof.
FEP: TFE/HFP fluoropolymer containing 11-12.5 wt % HFP, an average particle size of 8 micrometers and a melt flow rate of 6.8-7.8 g/10 min measured at 372° C. by the method of ASTM D-1238.
ETFE: E/TFE/PFBE fluoropolymer containing 19-21 wt % ethylene and 3-4.5 wt % PFBE having average particle size of 8 micrometers and a melt flow rate of 6-8 g/10 min measured at 298° C. by the method of ASTM D-1238.

The overcoat layers formed in the Examples have the following pre-bake compositions:

TABLE 2

Powder Overcoats

| Ingredient | A wt % | B wt % | 1 wt % | 2 wt % | 4 wt % | 5 wt % | 6 wt % |
|---|---|---|---|---|---|---|---|
| Epoxy | 100 | | | | | | |
| ETFE | | 100 | | | | | |
| Perfluoropolymers | | | | | | | |
| PFA | | | | | 99.2 | 100 | |
| FEP | | | | | | | 100 |
| PFA Fluorinated | | | | 100 | | | |
| PFA Modified PEVE | | | 100 | | | | |
| Stabilizer (Zn) | | | | | 0.8 | | |
| Total | 100 | 100 | 100 | 100 | 100 | 100 | 100 |

FEP: TFE/HFP fluoropolymer resin containing 11-12.5 wt % HFP having a melt flow rate of 6.8-7.8 g/10 min and an average particle size of 35 micrometers.
PFA: TFE/PPVE fluoropolymer resin containing 3.8-4.8 wt % PPVE having a melt flow rate of 10-17 g/10 min and an average particle size of 35 micrometers.
PFA modified with PEVE: TFE/PPVE/PEVE fluoropolymer resin containing 6.8-7.8 wt % PEVE prepared according to the teachings of U.S. Pat. No. 5,932,673 (Aten et al./DuPont) having a melt flow rate of 13-18 g/10 min and an average particle size of 8 micrometers.
PFA Fluorinated: TFE/PPVE fluoropolymer resin containing 3.8-4.8 wt % PPVE prepared according to the teachings of U.S. Pat. No. 4,743,658 (Imbalzano et al./DuPont) having a melt flow rate of 12-20 g/10 min and an average particle size range of 25 micrometers.
PFA: TFE/PPVE fluoropolymer resin containing 3.8-4.8 wt % PPVE having a melt flow rate of 10-17 g/10 min and an average particle size of 35 micrometers.

TABLE 3

Liquid Overcoat

| Ingredient | Overcoat 3 wt % |
|---|---|
| Perfluoropolymer PFA | 45.0 |
| Other Organics | 0.6 |
| Water | 43.8 |
| Thickener | 10.1 |
| Dispersing Agents | 0.5 |
| Total | 100 |

TABLE 4

Liquid Midcoat

| Ingredient | Midcoat 1 wt % |
|---|---|
| Perfluoropolymer PFA | 41.2 |
| Glycerine | 8.3 |
| Water | 42.8 |
| Red Mica | 3.9 |
| Thickener | 1.1 |
| Dispersing Agents | 0.4 |
| Other Organics | 1.1 |
| Tin Metal | 1.2 |
| Total | 100.0 |

The baking conditions are set forth in the Examples. Good adhesion of the primer layer to the substrate and of the primer layer to the overcoat layer is indicated by their performance in the PWA Test and the Cross-Hatch Adhesion Test.

The non-stick characteristic of the baked coatings in the Examples are confirmed by subjecting the coatings to the paraffin deposition test as described above. The baseline for comparison is the paraffin deposition test performed on commercially available epoxy-resin coated oil pipe, wherein the deposition of paraffin on the epoxy resin coating amounted to 0.0652 g/cm$^2$. The examples of this invention all have coatings with a wax deposition below that of standard epoxy resin coating.

Comparative Example A

Epoxy Standard

A layer of coating A (epoxy powder) is applied to a prepared stainless steel sleeve, followed by baking at 316° C. for 20 minutes. The dry film thickness (DFT) of the paint layer is 100-125 micrometers. When the coated sleeve is subjected to the Paraffin Deposition Test, a deposition of 0.0652 g/cm$^2$ is obtained.

Comparative Example B

ETFE Primer/ETFE Overcoat

A layer of primer 2 (aqueous ETFE) is applied to a prepared stainless steel sleeve and a prepared carbon steel panel, followed by baking at 150° C. for 10 minutes. The dry film thickness (DFT) of the primer layer is 12-19 micrometers (μ). A layer of overcoat B (powder ETFE) is applied over the dried primer layer. It is baked at 316° C. for 20 minutes. The total DFT is 100-125 micrometers and the total thickness of the overcoat is 81-113 micrometers. When the coated sleeve is subjected to the Paraffin Deposition Test, a deposition of 0.0327 g/cm$^2$ is obtained. When the coated carbon steel panel is subjected to the PWA test and Cross-Hatch Adhesion Test, the panel passes both tests.

Aqueous primers are not preferred for use in this invention because of the potential for reduced corrosion resistance over a prolonged period of time. ETFE overcoats are inferior to the perfluoropolymer overcoats of this invention.

Comparative Example C

Uncoated Substrate

An uncoated prepared stainless steel sleeve is subjected to the Paraffin Deposition Test, a deposition of 0.0296 g/cm$^2$ is obtained.

Example 1

FEP Primer/Modified PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 1 (PFA modified with PEVE powder) is applied over the dried primer layer. It is baked at 399° C. for 20 minutes. The total DFT is 60-75 micrometers. A second layer of overcoat is applied. It is baked at 371° C. for 20 minutes. The total DFT is 100-125 micrometers and the total thickness of the overcoat is 81-113 micrometers. An insulating layer is applied to the exterior of the sleeve.

When the coated sleeve is subjected to the Paraffin Deposition Test, a deposition of only 0.0168 g/cm$^2$ is obtained. When the coated carbon steel panel is subjected to the PWA test and Cross-Hatch Adhesion Test, the panel passes both tests.

Example 2

FEP Primer/Fluorinated PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 2 (fluorinated PFA powder) is applied over the dried primer layer. It is baked at 399° C. for 20 minutes. The total DFT is 60-75 micrometers. A second layer of overcoat 2 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0145 g/cm$^2$ is obtained. When the coated carbon steel panel is subjected to the PWA test and Cross-Hatch Adhesion Test, the panel passes both tests.

Example 3

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 3 (PFA liquid) is applied over the dried primer layer. It is baked at 399° C. for 20 minutes. The total DFT is 60-75 micrometers. A second layer of overcoat 3 is applied. It is baked at 371° C. for 20 minutes. The total DFT is 100-125 micrometers and the total thickness of the overcoat is 81-113 micrometers. When the coated sleeve is subjected to the Paraffin Deposition Test, a deposition of only 0.0124 g/cm$^2$ is obtained. When the coated carbon steel panel is subjected to the PWA test and Cross-Hatch Adhesion Test, the panel passes both tests.

Example 4

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 4 (PFA powder) is applied over the dried primer layer. It is baked at 399° C. for 20 minutes. The total DFT is 60-75 micrometers. A second layer of overcoat 4 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0124 g/cm$^2$ is obtained. When the coated carbon steel panel is subjected to the PWA test and Cross-Hatch Adhesion Test, the panel passes both tests.

Example 5

FEP Primer/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 5 (PFA powder) is applied over the dried primer layer. It is baked at 399° C. for 20 minutes. The total DFT is 60-75 micrometers. A second layer of overcoat 5 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0116 g/cm$^2$ is obtained. When the coated carbon steel panel is subjected to the PWA test and Cross-Hatch Adhesion Test, the panel passes both tests.

Example 6

FEP Primer/FEP Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 6 (FEP powder) is applied over the dried primer layer. It is baked at 399° C. for 20 minutes. The total DFT is 60-75 micrometers. A second layer of overcoat 6 is applied. It is baked at 371° C. for 20 minutes. The total DFT is 100-125 micrometers and the total thickness of the overcoat is 81-113 micrometers.

When the coated sleeve is subjected to the Paraffin Deposition Test, a deposition of only 0.0110 g/cm$^2$ is obtained. When the coated carbon steel panel is subjected to the PWA test and Cross-Hatch Adhesion Test, the panel passes both tests.

Example 7

FEP Primer/PFA Overcoat

A layer of primer 1(liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 5 (PFA powder) is applied over the dried primer layer. It is baked at 399° C. for 20 minutes. The total DFT is 60-75 micrometers. A second layer of overcoat 5 is applied. It is baked at 371° C. for 20 minutes. Additional layers of overcoat 1 are applied and baked at 343° C. for 20 minutes until the total DFT is 950-1050 micrometers and the total thickness of the overcoat is 931-1038 micrometers.

When the coated sleeve is subjected to the Paraffin Deposition Test, a deposition of only 0.0098 g/cm$^2$ is obtained. When the coated carbon steel panel is subjected to the PWA test and Cross-Hatch Adhesion Test, the panel passes both tests.

Example 8

FEP/PFA Overcoat

A layer of primer 1 (liquid FEP) is applied to a prepared stainless steel sleeve and a prepared carbon steel panel, followed by baking at 150° C. for 10 minutes. The dry film thickness (DFT) of the primer layer is 12-19 micrometers. A layer of overcoat 2 is applied over the dried primer layer. It is baked at 399° C. for 20 minutes. The total DFT is 60-75 micrometers. A second layer of overcoat 2 (fluorinated PFA) is applied. It is baked at 371° C. for 20 minutes. Additional layers of overcoat 4 are applied and baked at 343° C. for 20 minutes until the total DFT is 950-1050 micrometers and the total thickness of the overcoat is 931-1038 micrometers.

When the coated sleeve is subjected to the Paraffin Deposition Test, a deposition of only 0.0042 g/cm$^2$ is obtained. When the coated carbon steel panel is subjected to the PWA test and Cross-Hatch Adhesion Test, the panel passes both tests.

Example 9

FEP Primer/PFA Overcoat

A layer of primer 3 (liquid FEP) is applied to a prepared stainless steel sleeve and a prepared carbon steel panel, followed by baking at 150° C. for 10 minutes. The dry film thickness (DFT) of the primer layer is 8-12 micrometers. A layer of overcoat 2 (fluorinated PFA) is applied over the dried primer layer. It is baked at 399° C. for 20 minutes. The total DFT is 60-70 micrometers. A second layer of overcoat 2 (fluorinated PFA) is applied. The total DFT is 80-110 micrometers and the total thickness of the overcoat is 68-102 micrometers. It is baked at 371° C. for 20 minutes.

When the coated sleeve is subjected to the Paraffin Deposition Test, a deposition of only 0.0042 g/cm$^2$ is obtained. When the coated carbon steel panel is subjected to the PWA test and Cross-Hatch Adhesion Test, the panel passes both tests.

Example 10

FEP Primer/PFA Rotolined Overcoat

A carbon steel pipe suitable for conveying oil having a diameter of 3 inches (7.6 micrometers) and a length of 30 feet (9 m) is cleaned by baking 30 min @ 800° F. (427° C.) and grit blasted with 40 grit aluminum oxide to a roughness of approximately 70-125 microinches Ra. A layer of primer 1 is applied to the interior of the pipe, followed by baking at a temperature of 750° F. (399° C.). for five minutes to dry and fully bake (cure) the primer. The dry film thickness (DFT) of the primer layer is 8-12 micrometers. The primed pipe is rotolined with a composition containing a commercially available copolymer of TFE/PPVE powder having an MFR of 6 g/10 min and an average particle size of 475 μm that has been stabilized (fluorinated according to the teachings of U.S. Pat. No. 4,743,658 Imbalzano et al./DuPont). The powder composition is introduced to the interior of the pipe to be rotolined in the amount sufficient to obtain an overcoat lining thickness of 30 mils (762 micrometers). The pipe is temporarily closed at both ends and mounted on a mechanism that both rocks and rotates the pipe within in an air oven. The mechanism is commercially available as a Rock and Roll machine. The pipe is heated above the melting point of the copolymer particles of the overcoat and is rotated around its longitudinal axis during the heating while being rocked from end to end during the rotation at a temperature 740° F. (380° C.) for 120 min of pipe rotation. Despite, the long exposure to high temperature, the primer is surprisingly not degraded and still functions to adhere the coating to the pipe's interior. The pipe is rotated in an air oven resulting in lining the interior surface of the pipe with a coating of uniform distribution. Upon completion of the rotolining process, the oven is cooled and the rotolined pipe is examined for the quality of the rotolining. The temporary ends are removed from the pipe and the bubble-free quality of the lining is determined by observation of the lining with the naked eye. The lining is considered bubble free when no bubbles are visible within the lining thickness and the surface of the lining is smooth, i.e. free of voids, lumps, and craters.

For determining the adhesion quality, the coated pipe is sectioned and subjected to the PWA Test and the Cross-Hatch Adhesion Test as described above, except only an "X" is scribed in the Cross Hatch Test instead of a grid. The pipe sections tested herein pass the PWA test and no lining is removed with the Cross Hatch Test.

Example 11

Inorganic Scale Deposition Test

A number of the overcoats (FEP and PFA) from the foregoing Examples were subjected to coupon immersion testing in brine solutions in order to determine the reduction in inorganic scale deposition of the coated coupon, with the result being that scale deposition was reduced by more than 50 wt % as compared to the uncoated coupons. These tests were done by soaking coated and uncoated steel coupons in calcite and barite brine solutions having the following compositions:

| Brine A | g/kg water | Brine B | g/kg |
|---|---|---|---|
| $CaCl_2 \cdot 2H_2O$ | 36.87 | same | 8.6 |
| KCl | 11.43 | same | 4.38 |
| $MgCl_2 \cdot 6H_2O$ | 1.8 | same | 0.41 |
| NaCl | 138.9 | same | 89.09 |
| $Na_2SO_4$ | 0.32 | — | — |
| — | — | $BaCl_2$ | 3.08 |

The coupons were suspended for two days under 100 psi (6.9 MPa) pressure in either in Brine A heated at 140 F (60° C.) or in Brine B heated at 90° F. (32° C.) and the weight pickups (scale deposition) for the coated coupons were compared to that for the uncoated steel coupons to reveal the reduction in scale deposition for the coupons coated with linings of the present invention.

Example 12

Asphaltene Deposition Test

Asphaltene is a mixture of amorphous high molecular weight, polynuclear aromatic compounds, containing C, H, O, N, and S, and often metals such as V or Ni. Asphaltene is soluble in oil, but becomes insoluble with drop in pressure, change in pH, or solvency change such as occurs in oil pipe utility. Asphaltene deposition can be measured by the flow loop method as practiced by the Petroleum Research Center located at the New Mexico Institute of Mining and technology in Socorro, N.M. Briefly, the material to be tested is formed into a loop and oil is flowed through the loop under conditions to cause the asphaltene in the oil to become insoluble, so that it has a chance to deposit on the interior surface of the loop. The deposition of asphaltene is determined by weighing the loop after the flow experiment is completed, comparing such weight with the weight of the loop before the flow test. In greater detail, the loop being tested is a tube that 100 ft (30.5 m) long and has an interior diameter of 0.03 in (0.75 mm) and is made of either one of the overcoat perfluoropolymers disclosed in the foregoing Examples or of steel. The tube is formed into a coil (loop), like a spring, so that it will fit into a water bath maintained at 60° C. A 50/50 vol % mixture of asphaltene-containing oil and n-pentadecane solvent is metered through the loop at a rate of 0.24 ml/hr for 24 hrs. The oil tested had the following characteristics: API gravity of 28.8°, viscosity of 30 cP at 20°, and was composed of 51.1% saturates, 28.3% aromatics, 14.5% resins, 6.1% asphaltenes and contained 19 ppm Ni and 187 ppm V. For the uncoated steel loop, the weight gain from deposited asphaltene is 0.51 g, while for FEP and the fluorinated PFA of Example 8, there is no weight gain, indicating the effectiveness of the perfluoropolymer to reduce asphaltene deposition.

Example 13

Salt Water Permeation Test

This test is conducted to determine the salt water permeability of perfluoropolymers as compared to epoxy resin by exposing 5 mil (127 micrometers) thick coatings of these materials on steel coupons to salt water under severe conditions and subjecting the so-exposed coupons to the well-known Log Z-Electrical Impedance Spectroscopy. Impedance of the coating before and after the exposure is compared. A reduction in impedance indicates the permeability of the coating. In greater detail, the coated coupons are suspended in an autoclave having: 1) an aqueous phase with a 5 wt % aqueous solution of NaCl, 2) an organic phase with 50 volume % kerosene and 50 volume % toluene, and 3) a gas phase with 5 volume % hydrogen sulfide ($H_2S$), 5 volume % carbon dioxide ($CO_2$) and 90 volume % methane ($CH_4$), which is maintained at approximately 251° F. (122° C.) therein in contact with a portion of the coating. The autoclave is maintained at 251° F. (122° C.) and 1026 psi (70.8 MPa) for 29 days. The impedance of the coating is measured (before and after salt water exposure) using an electrochemical cell consisting of the coated coupon, a reference electrode, and an inert counter electrode. The electronic measuring equipment consists of a potentiostat, a frequency response analyzer and a computer with electrical impedance spectroscopy software. Impedance of the coating is measured as a function of the frequency of the applied AC voltage. The frequency ranges from 0.001 to 100 kHz. The resulting data is presented in the form of a Bode plot, consisting of Log Z plotted versus Log f, where Z is the impedance in ohms cm and f is frequency in Hertz. The comparison in impedance results is taken a 0.1 of the Bode plot, as follows:

| | Log Z impedance | |
|---|---|---|
| Coating | Before Exposure | After Exposure |
| PFA | 11.0 | 10.9 |
| FEP | 11.0 | 11.0 |
| Epoxy | 10.8 | 7.1 |

Tests of a one-coat system of FEP/PES which could only be applied to a thickness of 2 mils, are subjected to the same Autoclave conditions, and result in a Log Z impedance before exposure of 9.4, and after exposure, of 5.8.

The 34% decrease in impedance for the epoxy resin coating represents a substantial permeability of this coating to the salt water, and indeed the coating had blistered in places from the underlying steel coupon. In contrast, the impedance of perfluoropolymer coatings with no binder is substantially unchanged and there is no separation (no blistering) of the coating from the steel coupon, indicating substantial impermeability of these coatings to the salt water. This substantial impermeability can therefore be characterized by the absence of coating separation of the coating from the steel coupon or quantitatively by the reduction in Log Z impedance of less than 10%, preferably less than 5%. When the coated coupons are subjected to $H_2S$ gas and methane/toluene liquid mixture in the same autoclave under the same conditions as the salt water testing, no change in the coatings is noticed, indicating the greater severity of the salt water exposure.

Example 14

Single Layer Coating

Primer 1 is used a single layer coating on the coupon and tested as set forth in Example 11. Despite the presence of non-fluorine containing polymer binder (polyamideimide and polyether sulfone) in the primer composition, the deposition of inorganic scale on the coating is much less than for the bare steel coupon and about the same as for the FEP overcoat.

What is claimed is:

1. Process of reducing the deposition of asphaltenes, paraffin wax, or inorganic scale in an oil well pipe used to convey oil from underground deposits by providing a system of pipes connected end to end for conveying oil comprising a first pipe and a second pipe, the second pipe having a lining adhered to the interior surface thereof, the lining comprising a primer layer adhered to the interior surface of the pipe and an overcoat or a preformed film comprising a fluoropolymer adhered to the primer layer, where the overcoat has an exterior anti-stick surface consisting essentially of baked perfluoropolymer, the anti-stick surface reducing the deposition in the oil well pipe of asphaltenes, paraffin wax, and or inorganic scale as compared to the interior surface of the oil well pipe without the lining being present, so as to avoid pluggage of said system of pipes, wherein the first pipe is unlined or lined with a lining of a different material than the lining of the second pipe.

2. Process of reducing the deposition of asphaltenes, paraffin wax, or inorganic scale in an oil well pipe used to convey oil from underground deposits by providing a system of pipes connected end to end for conveying oil comprising a first pipe and a second pipe, the second pipe having a lining adhered to the interior surface thereof, the lining consisting essentially of a continuously adherent perfluoropolymer, where the lining of said second pipe has an exterior anti-stick surface, the anti-stick surface reducing the deposition in the oil well pipe of asphaltenes, paraffin wax, or inorganic scale as compared to the interior surface of the oil well pipe without the lining being present, so as to avoid pluggage of said system of pipes, wherein the first pipe is unlined or lined with a lining of a different material than the lining of the second pipe.

3. Process of reducing the deposition of asphaltenes, paraffin wax, or inorganic scale in an oil well pipe used to convey oil from underground deposits by providing a system of pipes connected end to end for conveying oil comprising a first pipe and a second pipe, the second pipe having a lining adhered to the interior surface thereof, wherein the lining of the second pipe comprises a barrier layer including a plurality of particles which form a mechanical barrier against permeation of water, gas and solvents to the pipe, where the lining of the second pipe has an exterior anti-stick surface, the anti-stick surface reducing the deposition in the oil well pipe of asphaltenes, paraffin wax, or inorganic scale as compared to the interior surface of the oil pipe without the lining being present, so as to avoid pluggage of the system of pipes, wherein the first pipe is unlined or lined with a lining of a different material than the lining of the second pipe.

4. The process of claim 1, 2 or 3, wherein the different material of the first pipe comprises fluorinated ethylene propylene.

5. The process of claim 1, 2 or 3, wherein the different material of the first pipe comprises epoxy.

6. The process of claims 1, wherein the primer layer comprises a perfluoropolymer.

7. The process of claim 1, 2 or 3, wherein the thickness of the lining in sections of the second pipe at a depth of 1500 feet or greater below the surface is 5 mils.

8. The process of claim 1, 2 or 3, wherein the thickness of the lining in the section of the second pipe at a depth of 1500 feet or less is 40-50 mils.

* * * * *